United States Patent [19]

Baker et al.

[11] 4,421,779
[45] Dec. 20, 1983

[54] PROCESS FOR TREATING CONFECTIONERY

[75] Inventors: John E. Baker; Michael G. Topor, both of Farmers Branch; John T. Ivers, Lewisville; H. Kent Stutz, Hurst, all of Tex.

[73] Assignee: Frito-Lay, Inc., Dallas, Tex.

[21] Appl. No.: 376,728

[22] Filed: May 10, 1982

[51] Int. Cl.³ .............................................. A23G 3/00
[52] U.S. Cl. ...................................... 426/660; 426/94; 426/103; 426/613
[58] Field of Search ............... 426/572, 606, 607, 103, 426/94, 659, 613

[56] References Cited

U.S. PATENT DOCUMENTS

| | | | |
|---|---|---|---|
| 1,414,022 | 4/1922 | Huston | 426/94 |
| 2,152,170 | 3/1939 | Areiter | 426/659 |
| 3,198,637 | 8/1965 | Harris et al. | 426/659 |
| 3,253,928 | 5/1966 | Bedenk et al. | 426/659 |
| 3,307,953 | 3/1967 | Siebers | 426/613 |
| 3,526,517 | 9/1970 | Shaffer et al. | 426/659 |

OTHER PUBLICATIONS

Minifie, B. W., Chocolate, Cocoa, and Confectionery, 2nd Ed. Avi Pub. Co., Westport, Conn., 1980, pp. 210, 212, 213.

*Primary Examiner*—Jeanette M. Hunter
*Attorney, Agent, or Firm*—Bernard, Rothwell & Brown

[57] ABSTRACT

A treated confectionery can be baked along with a dough and exhibits the distinct characteristics of a confectionery even after baking. The confectionery, which is comprised of a substantial amount of fat, is prepared by heating a confectionery of suitable composition to form a melt, and then cooling and solidifying the confectionery through the temperature range of about 120° F. to about 80° F. at an overall rate that is sufficiently slow for the desired product characteristics to develop.

4 Claims, No Drawings

PROCESS FOR TREATING CONFECTIONERY

This invention relates to a method of preparing confectionery such as icing for forming with a dough in an intertwined or swirl pattern. Prior to forming, the confectionery, which is comprised of a substantial amount of fat, as well as sugar, water and sometimes minor amounts of flavoring or coloring agents, is treated by melting and slow cooling in a manner which provides the confectionery with proper characteristics for forming with the dough and for retaining its desired body and flavor properties after baking.

An attractive form of baked products such as cookies is a dough, within which is disposed in a swirl pattern a confectionery, e.g., icing or filling. Such products may be made by rolling the dough into a more or less flat layer and convering it with the confectionery. The resulting layered material may be rolled on itself into a long body having a cross-sectional swirl pattern in which the dough and confectionery are spiralled within one another. Cookies or other products may be made by cutting the long body into relatively thin cross-sectional pieces which are then baked.

It is, therefore, necessary to impart the proper body to the confectionery to make it suitable for forming with the dough if one is to obtain satisfactorily the swirl-patterned products composed of these materials. The confectionery must still exhibit its customary consistency and flavor after baking, and the means used to thicken the confectionery must be amenable to providing the confectionery with those properties which make the product attractive to consumers. Since the latter are buying the product for its mixed dough and confectionery tastes, textures and coloring, the confectionery must have its expected characteristics after baking.

It is therefore an object of this invention to provide a confectionery of a consistency suitable for forming with dough, and which retains its expected characteristics after baking.

This and other objects are achieved by treating a confectionery of suitable composition before forming to impart to it a doughy consistency under forming conditions. The confectionery, which preferably contains at least about 50% of the fat as unsaturated fat, is treated by melting and heating to a suitable temperature and then slowly cooling the melt over a sufficiently long period of time to impart the desired characteristics for use in the forming process.

The confectionery used to produce an icing or filling for forming with dough should contain a substantial amount of fat and should normally be essentially solid or nonfluid in the temperature range of about 70°–90° F. Preferably the confectionary should contain about 25 to 35 weight percent fat, about 25 to 50 weight percent sugar, about 0.5 to 0.8 weight percent water, and, if desired, minor amounts of flavoring or coloring agents. The fats, which are derived from carboxylic acids, may contain both unsaturated and saturated fatty acid moieties with one or more monoolefinically unsaturated fatty acid moieties, for instance oleic acid, comprising at least about 50% of the total fatty acid moiety content, and preferably at least about 55% of the fatty acid moiety content of the fat. Also, less than about 10% of the saturated fatty acid moiety should be lauric acid. The sugar may be sucrose or any other suitable sugar or other sweetener. The dough may be comprised of wheat flour, or some other suitable ground grain, and water in amounts suitable to provide a composition of dough consistency. The dough may contain additional ingredients such as margarine or butter, water, salt and the like. The quantities of flavoring or coloring ingredients in the confectionary to be treated may be substantially altered without destroying the consistency properties of the confectionary necessary to this invention.

It has been found that confectioneries having fats containing about 50%–70% of mono-olefinically unsaturated fatty acid moieties, especially the oleic acid moiety, may be melted and slow-cooled in accordance with this invention to produce an icing with the desired dough-like consistency during forming and having the typical confectionery taste and texture after baking. A confectionary which was melted and slow-cooled but which contained about 25%–30% of mon-olefinically unsaturated fatty acid moiety did not produce an icing suitable for forming with dough. It was also found that a confectionery containing fat with about 50%–70% oleic acid moiety when diluted with up to about 75% of the confectionery with only 25%–30% oleic acid in the resulting mixture, produced an icing which after being melted and slow-cooled, had suitable forming characteristics, but which became unstable after about one day.

It was further found that confectionery fat with more than about 10% lauric acid did not produce a suitable compound for forming with dough. The type of processing to which a confectionery is subjected before it is slow-cooled and the resulting particle size have been found to be important factors in the production of an icing or filling with the desired forming and other characteristics. Two kinds of processing often used in the production of confectioneries are melanger blending and ribbon blending, the latter being preferred in making the confectionary of the present invention. Melanger blending produces the greatest amount of emulsification and is the less desirable of the two blending methods for the purposes of this invention. But even melanger blending may be employed to make the confectionery if an appropriate particle size is maintained, say of at least about 0.01 millimeter (mm) or larger. It has also been found that the desirable properties of doughlike consistency are best achieved when ribbon blending is used to achieve an average particle size from about 0.03 mm to at least about 0.005 mm, and preferably between about 0.01 and 0.02 mm.

To obtain a filling or icing of dough-like consistency which exhibits satisfactory formability, a confectionery with the above described characteristics should be melted by heating to a suitable temperature, say around 110° to 130° F., preferably about 120° F. and then cooled to about 70°–90° F. (preferably about 80°) at a sufficiently slow rate to produce an icing with the desired consistency. Best results have been obtained when the melt was cooled from a temperature of about 120° F. down to about 78°–85° F. at a rate of up to about 0.5° to 1.25° F. per hour (preferably 1° F. per hour). After cooling, the products may be made by rolling the dough into a more or less flat layer and covering it with the confectionary. The resulting layered material may be rolled on itself into a long body having a cross-sectional swirl pattern in which the dough and confectionery are spiralled within one another. Cookies or other products may be made by cutting the long body into relatively thin cross-sectional pieces which are then baked. The resulting product has a swirled appearance with the dough and icing swirled around one another to give a pleasing appearance and combination of textures and tastes after the product is baked under standard conditions.

Treatment of a suitable confectionery formed according to this invention will be further illustrated by the following example.

EXAMPLE

The following table describes the fatty acid content of four samples of confectionery fat.

| Percent of Fatty Acid Content in Confectionery Fat contained in four lots of confectionery | | | | |
|---|---|---|---|---|
| Acid | Lot 1 | Lot 2 | Lot 3 | Lot 4 |
| Butyric | 0.06% | 0.59% | 0.74% | 0.00% |
| Caproic | 0.82 | 0.11 | 0.69 | 1.02 |
| Caprylic | 0.32 | 0.09 | 0.23 | 2.05 |
| Capric | 0.47 | 0.10 | 0.30 | 2.00 |
| Lauric | 9.10 | 1.79 | 5.66 | 22.90 |
| Myristic | 4.17 | 0.87 | 2.72 | 10.30 |
| Palmitic | 12.30 | 12.00 | 17.00 | 16.90 |
| Palmitoleic | 0.00 | 0.00 | 0.11 | 0.00 |
| Stearic | 13.30 | 15.40 | 11.40 | 18.90 |
| Oleic | 55.90 | 66.20 | 55.20 | 25.90 |
| Linoleic | 2.98 | 2.29 | 5.57 | 0.00 |

Each of the above lots of confectionery fat was blended with sugar and water and separately melted and heated to a temperature of about 120° F. and then slow-cooled over a period of about 24–48 hours to a temperature of about 70°–90° F., preferably 78°–85° F.

A product containing the resultant confectionery was made by rolling dough into a more or less flat layer and covering it with the confectionery. The resulting layered material is rolled on itself into a long body having a cross-sectional swirl pattern in which the dough and confectionery are spiralled within one another. Cookies or other products are made by cutting the long body into relatively thin cross-sectional pieces which were then baked. The material was then baked at temperatures and for periods of time commonly used for such products, e.g., cookings. Lots 1, 2 and 3 produced a confectionery with desirable properties after slow cooling under forming conditions. Lot 4, however, did not produce a confectionery of suitable dough-like consistency under forming conditions. Other confectionery with suitable fatty acid composition may also be treated with the process of this invention to produce a confectionery with dough-like consistency under forming conditions and which retains its confectionary taste and texture after baking.

Melting and slow cooling a confectionary of suitable composition in the manner described above produces an icing or filling of dough-like consistency which may be formed by rolling and the confectionery, after baking, is similar in taste and consistency to normal confectioneries.

Dough-like consistency refers to a material that exhibits many of the physical characteristics of a cookie dough. It is a non-Newtonian semi-solid material having pseudoplastic flow characteristics. In its "slow-cooled state," the compound can be formed, but will spread with time; it can be stretched, but has minimal elasticity; it has a pasty feel and, upon closer examination, has a grainy appearance. Normal confectionery consistency refers to a hard, solid material which cannot be deformed without destroying the structure. This is the typical chocolate bar or chocolate chip structure common to normal confectionery compounds.

It is claimed:

1. A process for treating a confectionery to enhance the forming properties thereof, said confectionery comprised of sugar, water and fat containing at least about 50% unsaturated fatty acid and less than about 10% lauric acid moieties, based on the total fatty acid moiety content, which comprises melting said confectionery and cooling the melted confectionery through the temperature range of about 120° F. to about 78°–85° F. slowly at an average rate no greater than about 1.25° F. per hour to provide the confectionery with a dough-like consistency wherein the forming properties are enhanced and said confectionery may be formed without destroying its structure.

2. A process for treating a confectionery comprised of sugar, water and a substantial amount of fat as recited in claim 1 wherein said confectionery has an average particle size between about 0.005 millimeters and 0.03 millimeters.

3. A process for treating a confectionery comprised of sugar, water and a substantial amount of fat as recited in claim 1 wherein said confectionery, after forming and baking under cookie baking conditions, is similar in taste and consistency to normal confectionery.

4. A process of treating a confectionery to provide it with a dough-like consistency suitable for being formed without destroying its structure together with bakery dough to form a composite product of the dough and confectionery comprising the steps of selecting a confectionery having sugar, water and fat containing at least 50% unsaturated fatty acid and less than 10% lauric acid moieties, melting the confectionery by heating it to at least 120° F., blending the melted confectionery to produce an average particle size between 0.005 mm and 0.03 mm, and slowly cooling the confectionery from a temperature at about 120° F. over a period of at least 24 hours at an average cooling rate of up to 1.25° F. per hour to a temperature in the range of 78°–85° F. to produce a confectionery which has dough-like consistency and may be formed by rolling and, after baking under cookie baking conditions, is similar in taste and consistency to normal confectionery.

* * * * *

UNITED STATES PATENT AND TRADEMARK OFFICE
CERTIFICATE OF CORRECTION

PATENT NO. : 4,421,779

DATED : December 20, 1983

INVENTOR(S) : John E. Baker et al.

It is certified that error appears in the above-identified patent and that said Letters Patent is hereby corrected as shown below:

Column 1, line 18, delete "convering" and insert therefor -- covering --.

Column 1, line 60, delete "monoolefinically" and insert therefor -- mono-olefinically --.

Column 2, line 16, delete "mon-olefinically" and insert therefor -- mono-olefinically --.

Column 2, line 43, delete "doughlike" and insert therefor --dough-like --.

Column 2, line 61, delete "confectionary" and insert therefor -- confectionery --.

Column 3, line 43, delete "cookings" and insert therefor -- cookies --.

Column 3, line 52, delete "confectionary" and insert therefor -- confectionery --.

Column 3, line 54, delete "confectionary" and insert therefor -- confectionery --.

Signed and Sealed this

Twenty-third Day of October 1984

[SEAL]

Attest:

GERALD J. MOSSINGHOFF

Attesting Officer     Commissioner of Patents and Trademarks